United States Patent Office 3,780,024
Patented Dec. 18, 1973

3,780,024
**2-AMINOALKYLAMINO-4,5-DIHYDRO-3H-
1,3-BENZODIAZEPINES**
John T. Suh, 3709 W. Scenic Drive, 111 N., Mequon,
Wis. 53092, and Richard A. Schnettler, 6234 W.
Donges Lane, Brown Deer, Wis. 53223
No Drawing. Filed June 30, 1972, Ser. No. 268,130
Int. Cl. C07d 53/04
U.S. Cl. 260—239 BD            9 Claims

ABSTRACT OF THE DISCLOSURE

The 2 - aminoalkylamino-4,5-dihydro-3H-1,3-benzodiazepines and their pharmaceutically acceptable acid addition salts are antihypertensive agents. Compounds disclosed are 2-N,N-dimethylaminoethylamino-4,5-dihydro-3H-1,3-benzodiazepine dihydrochloride and 2-N,N-dimethylaminopropylamino - 4,5 - dihydro - 3H-1,3-benzodiazepine dihydrochloride.

DETAILED DESCRIPTION

The compounds of the present invention have the following formula

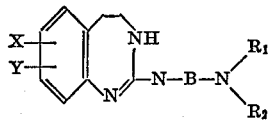

in which X and Y are selected from hydrogen, hydroxy, halogen, $CF_3$, alkyl of 1 to 4 carbon atoms or alkoxy of 1 to 4 carbon atoms, especially methoxy, B is an alkylene of 1 to 4 carbon atoms such as ethylene, propylene and isopropylene, and $R_1$ and $R_2$ are selected from hydrogen, lower alkyl of 1 to 4 carbon atoms such as methyl, ethyl, isopropyl and butyl or a phenyl lower alkyl of 7 to 13 carbon atoms such as benzyl, phenethyl or phenylisopropyl.

BACKGROUND OF THE INVENTION

U.S. Pat. No. 3,496,179 discloses 2-amino-3,4-dihydroquinazolines which are antihypertensive agents and an article by H. R. Rodriguez et al., J. Org. Chem., 33, 670 (1968) discloses the compound 2-amino-4,5-dihydro-7,8-dimethoxy-3H-1,3-benzodiazepine. Other patents of possible interest are British Pat. No. 1,183,135, German Pat. No. 1,947,062 and U.S. Pats. Nos. 3,474,090 and 3,157,642.

PREPARATION OF THE COMPOUNDS

The compounds of the present invention are readily prepared from β-(2-aminophenyl)ethylamines of the formula

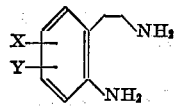

which are known compounds.

Representative of the amines that may be used as starting materials are the following:

β-(2-aminophenyl)ethylamine,
β-(2-amino-4,5-dimethoxyphenyl)ethylamine,
β-(2-amino-4,6-dimethoxyphenyl)ethylamine,
β-(2-amino-4,5-dichlorophenyl)ethylamine,
β-(2-amino-3,6-dichlorophenyl)ethylamine,
β-(2-amino-4,5-ditrifluoromethylphenyl)ethylamine, and
β-(2-amino-4,5-dimethylphenyl)ethylamine.

The compounds of the invention are conveniently prepared by reacting the selected β-(2-aminophenyl)ethylamine with carbon disulfide in ethanol to form the corresponding 2,3,4,5 - tetrahydro - 1H - 1,3-benzodiazepine-2-thione which, when treated with methyliodide in a mixture of methanol and ethanol, forms the corresponding 2-methylmercapto-4,5-dihydro-3H-1,3-benzodiazepine hydroiodide. The thus obtained hydroiodide is then dissolved in anhydrous acetonitrile and reacted with an appropriate aminoalkylamine under reflux conditions to form the desired 2 - aminoalkylamino - 4,5-dihydro-3H-1,3-benzodiazepine.

The described process may be illustrated as follows:

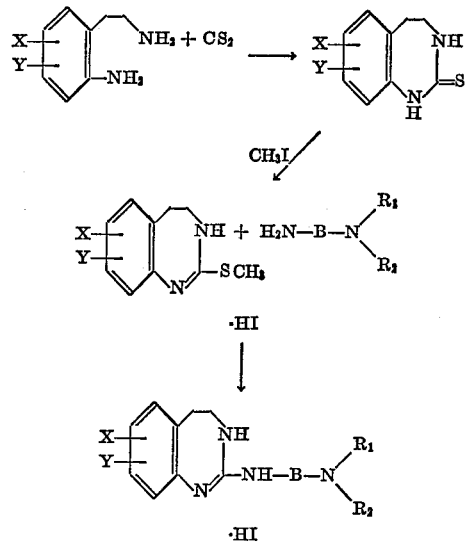

in which X, Y, B, $R_1$ and $R_2$ are as previously defined.

Representative of the amines which may be employed in the described process are the following:

β-N,N-dimethylaminoethylamine,
α-N,N-dimethylaminopropylamine,
β-N,N-diethylaminoethylamine,
β-N-methyl-N-ethylaminoethylamine,
β-N-ethyl-N-benzylaminoethylamine,
γ-N,N-diisopropylaminopropylamine, and
Δ-N,N-dimethylaminobutylamine.

Among the compounds which may be prepared by the described process are the following:

2-(β-N,N-dimethylaminoethylamino)-4,5-dihydro-3H-
  1,3-benzodiazepine dihydroiodide,
2-(α-N,N-dimethylaminopropylamino)-4,5-dihydro-7,8-
  dimethoxy-3-H-1,3-benzodiazepine dihydroiodide,
2-(α-N,N-dimethylaminopropylamino)-4,5-dihydro-3H-
  1,3-benzodiazepine dihydroiodide,
2-(β-N,N-dimethylaminoethylamino)-4,5-dihydro-7,8-
  dimethoxy-3H-1,3-benzodiazepine dihydrodide, and
2-(α-N,N-dibutylaminopropylamino)-4,5-dihydro-6,9-
  difluoro-3H-1,3-benzodiazepine dihydrodiodide.

Alternative methods of preparing the compounds of the present invention such as those described in the examples may also be employed.

The compounds in which X and/or Y are hydroxy may be readily prepared from the corresponding compounds in which X and Y are aralkoxy or alkoxy by conventional procedures.

Acid addition salts of the compounds of the present invention may be conveniently produced by contacting the free base form of the compounds with a suitable acid such as sulfuric acid, hydrochloric acid, succinic acid, tartaric acid, benzoic acid or fumaric acid.

The thiocyanic acid addition salts of the compounds when condensed with formaldehyde form resinous materials useful as pickling agents according to U.S. Pats. Nos. 2,425,320 and 2,606,155. The compounds also form fluosilicic acid addition salts which are useful as moth-proofing agents according to U.S. Pats. Nos. 1,915,334 and 2,075,359.

The compounds of the invention are pharmacologically active. For example, the compound 2-(β-N,N-dimethylaminoethylamino)-4,5-dihydro - 3H - 1,3 - benzodiazepine dihydrochloride, when evaluated in mouse behavioral studies at intraperitoneal doses of 30 to 300 mg./kg., was found to cause central nervous system depression. The mouse behavioral studies also indicated that the compound was relatively safe and possessed $LD_{50}$'s in excess of 75 mg./kg. of body weight. The behavioral studies were conducted essentially in accordance with the procedure outlined by S. Irwin in "Animal and Clinical Pharmacologic Techniques in Drug Evaluation," J. H. Nodine and P. E. Siegler, Ed., Year Book Medical Publishers, Inc., 1964. In the standard anesthetized, vagotomized cat test the forementioned compound was found at intravenous doses of 10 mg./kg. to substantially decrease the blood pressure of the animals.

When intended for pharmaceutical use, the compounds are preferably combined with one or more suitable pharmaceutical diluents and additives and formed into unit dosage forms for oral or parenteral administration such as tabelts, capsules and solutions.

The following examples are presented to illustrate this invention:

Example 1.—7,8-dimethoxy-2,3,4,5-tetrahydro-1H-1,3-benzodiazepin-2-thione

In 160 ml. ethanol 10.0 (0.0442 mole) β-(2-nitro-4,5-dimethoxyphenyl)ethylamine is dissolved and 0.2 g. platinum oxide is suspended. The mixture is shaken until the theoretical amount of hydrogen is taken up. The mixture is filtered and set aside.

In 20 ml. ethanol 7.6 g. (0.1 mole) carbon disulfide is dissolved. The solution is chilled to 0° C. and the above solution slowly added dropwise over a one hour period. The solution is maintained at 0° C. during the addition and then allowed to stir at room temperature for 48 hours and finally reuflxed 2 hours. The system is cooled and the solid collected to give 7,8-dimethoxy-2,3,4,5-tetrahydro-1H-1,3-benzodiazepin-2-thione as a yellow solid, M.P. 250°.

Example 2.—2-methylmercapto-7,8-dimethoxy-4,5-dihydro-3H-1,3-benzodiazepine hydroiodide In 200 ml. methanol is suspended 18.70 g. (0.0785 mole) 7,8 - dimethoxy-2,3,4,5-tetrahydro-1H-1,3-benzodiazepin-2-thione and 11.2 g. (0.079 mole) methyl iodide is added dropwise. The mixture is refluxed and stirred 2 hours, cooled and filtered. The filtrate is diluted with ether until all the solid has precipitated to give 2-methylmercapto-7,8-dimethoxy-4,5-dihydro - 3H - 1,3 - benzodiazepine hydroiodide as a beige solid, M.P. 197–200°.

Example 3.—2,3,4,5-tetrahydro-1H-1,3-benzodiazepin-2-thione

In 50 ml. ethanol is dissolved 9.2 g. (0.12 mole) carbon disulfide and the solution is chilled in an ice bath. β-(2-aminophenyl)ethylamine is slowly added over a 30 minute period. The mixture is allowed to stand for 17 hours at room temperature and then refluxed for 2 hours, cooled, and the solid collected to give 2,3,4,5-tetrahydro-1H-1,3-benzodiazepin-2-thione, M.P. 195°.

Example 4.—2-methylmercapto-4,5-dihydro-3H-1,3-benzodiazepine hydroiodide

In a mixture of 100 ml. ethanol and 100 ml. methanol is dissolved 4.54 g. (0.0255 mole) 2,3,4,5-tetrahydro-1H-1,3-benzodiazepin-2-thione and 3.64 g. (0.026 mole) methyl iodide. The mixture is refluxed one hour and concentrated to 50 ml., filtered, and diluted with ether to precipitate the salt. 2-methylmercapto-4,5-dihydro-3H-1,3-benzodiazepine hydroiodide as a white solid is collected, M.P. 175°.

Example 5.—2 - (γ - N,N - dimethylaminopropylamino)-4,5 - dihydro - 7,8 - dimethoxy - 3H - 1,3 - benzodiazepine dihydrochloride In 20 ml. dry acetonitrile are dissolved 5.0 g. (0.0132 mole) 2 - methylmercapto-7,8-dimethoxy-4,5-dihydro-3H-1,3-benzodiazepine hydroiodide and 2.69 g. (0.0240 mole) γ - N,N - dimethylaminopropylamine. The solution is refluxed 24 hours, cooled, and poured into 200 ml. water and extracted with ether. The aqueous phase is basified with sodium hydroxide and extracted with chloroform, washed with water, and dried. Evaporation of the chloroform affords an oil which is treated with ethereal hydrochloric acid, the solid collected and recrystallized twice from 150 ml. 2:1 isopropanol-methanol to give 2-(γ-N,N-dimethylaminopropylamino) - 4,5 - dihydro-7,8-dimethoxy - 3H-1,3 - benzodiazepine dihydrochloride as a white solid, M.P. 264–265°.

2-Example 6.—2-(γ-N,N-dimethylaminopropylamino)-4,5-dihydro-3H-1,3-benzodiazepine dihydrochloride In 20 ml. dry acetonitrile is dissolved 5.0 g. (0.0156 mole) 2-methylmercapto-4,5-dihydro-3H-1,3-benzodiazepine hydroiodide and 3.20 g. (0.0313 mole) γ-N,N-dimethylaminopropylamine. The solution is refluxed 18 hours, poured into 200 ml. water and extracted with ether. The aqueous phase is basified with 10% sodium hydroxide and extracted with chloroform, washed with water and dried. Evaporation of the solvent affords an oil which is converted to the hydrochloride salt with ethereal HCl. The solid is recrystallized from isopropanol to give 2-(γ-N,N-dimethylaminopropylamino) - 4,5 - dihydro-3H-1,3-benzodiazepine dihydrochloride, M.P. 234–236°.

Analysis.—Calcd. for $C_{14}H_{24}N_4Cl_2$ (percent): C, 52.66; H, 7.57; N, 17.54. Found (percent): C, 52.68; H, 7.83; N, 17.40.

Example 7.—2-(β-N,N-dimethylaminoethylamino)-4,5-dihydro-3H-1,3-benzodiazepine dihydrochloride In 10 ml. dry acetonitrile is dissolved 2.0 g. (0.00625 mole) 2-methylmercapto-4,5-dihydro-3H-1,3-benzodiazepine hydroiodide and 1.1 g. (0.0125 mole) β-N,N-dimethylaminoethylamine. The solution is refluxed 15 hours, poured into water (200 ml.) and extracted with ether. The aqueous phase is basified with 10% sodium hydroxide solution and extracted with chloroform, washed with water, and dried. Evaporation of solvent gives an oil which is converted to the hydrochloride salt in ethereal HCl. Recrystallization from isopropanol affords 2-(β-N,N - dimethylaminoethylamino) - 4,5 - dihydro-3H-1,3-benzodiazepine dihydrochloride as white crystals, M.P. 203.5–205.5°.

Analysis.—Calcd. for $C_{14}H_{24}N_4Cl_2$ (percent): C, 52.66; H, 7.57; N, 17.54. Found (percent): C, 52.68; H, 7.83; N, 17.40.

Example 8.—2-(β - N,N - dimethylaminoethylamino)-4,5-dihydro-7,8-dimethoxy - 3H - 1,3 - benzodiazepine dihydrochloride Phosphorous oxychloride (1 ml.) and 1.0 g. (0.0045 mole) 2,3,4,5-tetrahydro - 7,8 - dimethoxy-1H-1,3-benzodiazepin-2-one are combined and heated to reflux for 2 hours, after which time the excess phosphorous oxychloride is removed with a stream of nitrogen. The mixture is cooled and 10 ml. β-N,N-dimethylaminoethylamine added and the system refluxed for 1 hour. The residue is dissolved in 6 N hydrochloric acid and washed with chloroform. The acid solution is basified with 10% sodium hydroxide and extracted into chloroform, washed with water, and dried. Evaporation of the solvent affords a brown oil which is dissolved in ether and treated with excess ethereal hydrochloric acid. The solid is collected and crystallized from methanol to give 2-(β-N,N-dimethylaminoethylamino) - 4,5 - dihydro - 7,8 - dimethoxy-3H-1,3-benzodiazepine dihydrochloride, M.P. 277° C.

*Analysis.*—Calcd. for $C_{15}H_{26}N_4O_2Cl_2$ (percent): C, 49.31; H, 7.17; N, 15.34. Found (percent): C, 49.06; H, 7.05; N, 15.07.

We claim:

1. A compound selected from a compound of the formula

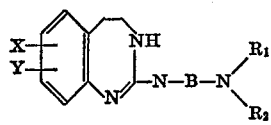

and pharmaceutically acceptable salts thereof, in which X and Y are hydrogen, hydroxy, halogen, $CF_3$, lower alkoxy of 1 to 4 carbon atoms or lower alkyl of 1 to 4 carbon atoms, B is an alkylene of 1 to 4 carbon atoms, and $R_1$ and $R_2$ are selected from hydrogen, lower alkyl of 1 to 4 carbon atoms or a phenyl lower alkyl of 7 to 13 carbon atoms.

2. A compound of claim 1 in which X and Y are hydrogen.

3. A compound of claim 1 in which X and Y are methoxy.

4. A compound of claim 1 in which B is ethylene or propylene.

5. A compound of claim 1 in which X and Y are hydrogen or methoxy.

6. The compound of claim 1 in which X and Y are methoxy, B is ethylene, and $R_1$ and $R_2$ are methyl.

7. The compound of claim 1 in which X and Y are methoxy, B is propylene, and $R_1$ and $R_2$ are methyl.

8. The compound of claim 1 in which X and Y are hydrogen, B is ethylene, and $R_1$ and $R_2$ are methyl.

9. The compound of claim 1 in which X and Y are hydrogen, B is propylene, and $R_1$ and $R_2$ are methyl.

References Cited

UNITED STATES PATENTS

| | | | |
|---|---|---|---|
| 3,496,179 | 2/1970 | Hess | 260—256.4 Q |
| 3,681,340 | 8/1972 | Rodriguez et al. | 260—239 BD |

ALTON D. ROLLINS, Primary Examiner

U.S. Cl. X.R.

260—239.3 B; 424—244